United States Patent [19]

Bartholomew

[11] Patent Number: 5,197,698
[45] Date of Patent: Mar. 30, 1993

[54] METHOD OF MOUNTING AND ISOLATING AUTOMOTIVE EXHAUST SYSTEMS

[75] Inventor: Donald D. Bartholomew, Mt. Clemens, Mich.

[73] Assignee: Proprietary Technology, Inc., Southfield, Mich.

[21] Appl. No.: 674,199

[22] Filed: Mar. 25, 1991

[51] Int. Cl.$^5$ ............................................. E21F 17/02
[52] U.S. Cl. .................................... 248/60; 180/89.2; 180/309; 267/152; 267/165
[58] Field of Search ...................... 248/58, 60, 49, 610; 180/309, 89.2; 267/165, 31, 152

[56] References Cited

U.S. PATENT DOCUMENTS

| | | | |
|---|---|---|---|
| 3,292,887 | 12/1966 | Cassel et al. | 248/60 |
| 4,121,812 | 10/1978 | Dousset | 267/152 X |
| 4,448,449 | 5/1984 | Halling . | |
| 4,634,088 | 1/1987 | Schad | 248/60 |
| 4,660,797 | 4/1987 | Tonnies | 248/610 |
| 4,727,957 | 3/1988 | Fujita | 248/60 X |
| 4,747,624 | 5/1988 | Faber . | |
| 4,762,330 | 8/1988 | Lönne et al. . | |
| 4,778,203 | 10/1988 | Bartholomew | 285/281 X |
| 4,779,901 | 10/1988 | Halling . | |
| 4,779,904 | 10/1988 | Rich . | |
| 4,796,841 | 1/1989 | Baker et al. | 248/60 |
| 4,817,909 | 4/1989 | Deane | 267/152 X |
| 4,871,181 | 10/1989 | Usher et al. . | |
| 4,905,972 | 3/1990 | Scowen | 267/165 X |
| 4,919,403 | 4/1990 | Bartholomew | 267/313 |

Primary Examiner—Ramon O. Ramirez
Attorney, Agent, or Firm—H. Keith Miller

[57] ABSTRACT

An exhaust system hanger has a flat serpentine spring encapsulated by an elastomeric block. The spring provides the stiffness to support and retain accelerations. The elastomeric member provides an absorptive member for noise and a dampening means for vibration.

11 Claims, 4 Drawing Sheets

SECOND CURVE PART THICKNESS
DEFORMATION IN THE THICKNESS DIRECTION

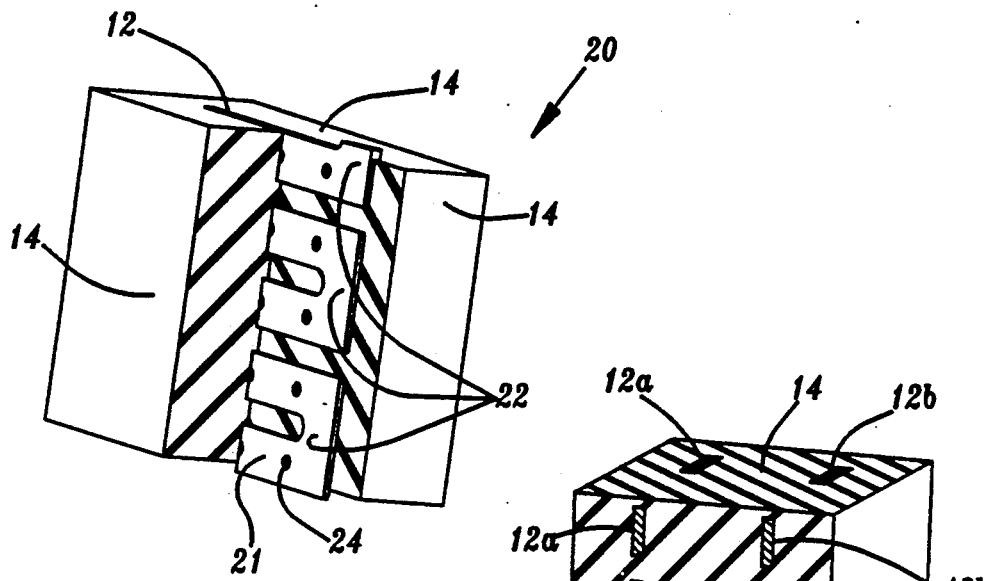
Fig - 2
Fig - 3
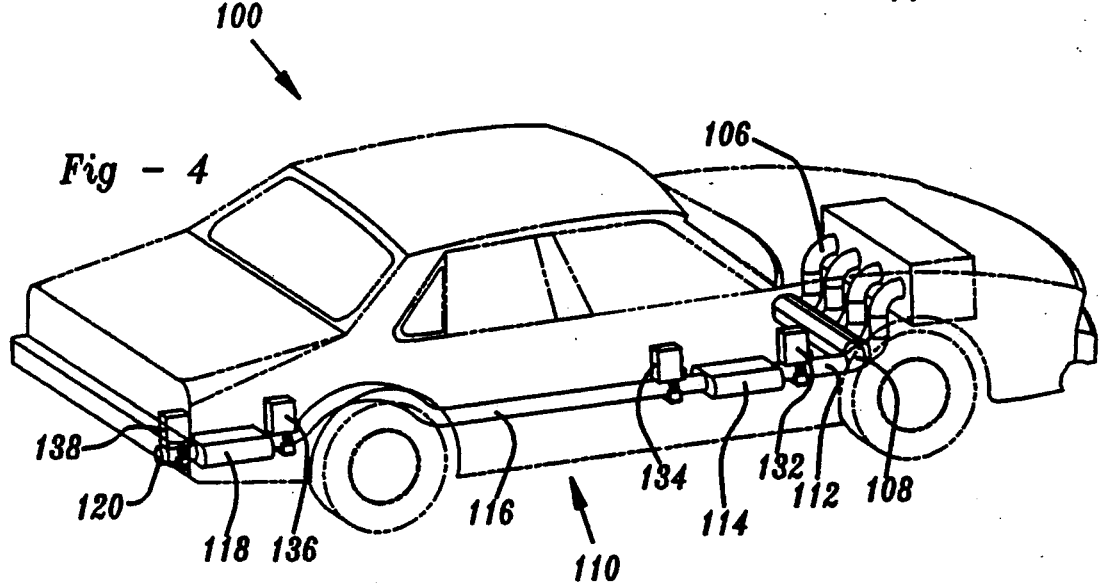
Fig - 4

METHOD OF MOUNTING AND ISOLATING AUTOMOTIVE EXHAUST SYSTEMS

BACKGROUND AND SUMMARY OF THE INVENTION

The present invention relates to vehicle exhaust systems and, more particularly, to a mounting connection for the suspension of engine exhaust pipes or the like.

Suspending an automotive exhaust system requires more than just rigidly mounting the system from the engine exhaust manifold to the body or frame of the vehicle. Designers must account for movement of the engine, the mass of the suspended system, the resultant system forces, and any noise or shock which might be transmitted to the vehicle passenger compartment. These are considerations which are not easily met with current solutions to the suspension of vehicle exhaust systems. Currently, one solution is to use a portion of an elastomer or webbing. To cope with these various requirements, currently, a rubber part, often called a "doughnut" because of its somewhat round torous like shape, is used between "hangers" that are attached to the vehicle and to the exhaust system, to support the exhaust system.

Considering the various noises, shocks, and forces that the suspension member must isolate from the vehicle body or frame, designer must take noise amplitude peaks into consideration. That is, the time between peaks of the noise frequencies, and the transmission of these various noises, shocks, and forces from the system to the vehicle body or frame must be considered. If one also considers the noises produced by the exhaust and engine, a very extensive frequency spectrum becomes apparent to the designer. A good suspension member must not transmit these frequencies to the vehicle attachment.

To overcome the frequency problem, elastomers, which do not transmit these frequencies would be a simple solution, however, elastomers will not resist considerable forces. If one considers that a portion of the exhaust system, like a catalytic converter, which may easily weigh 25 pounds and shock loads of 10 g "G's" could be imposed, yielding a sudden 8,000 lb. force, the magnitude of the problem of the elastomers becomes apparent. Other vehicle systems like the vehicle suspension system and tires, etc., act to limit the actual shock loads to lower values, but very high forces must be withstood in any case.

The method herein disclosed involves the use of a new type r of spring which is made from a flat strip of material, like stainless steel. This spring has a very high force per unit size and weight and its construction substantially prohibits noise frequency conduction. By encapsulating the spring in elastomeric material, which effectively absorbs the noise energy frequencies that would otherwise be transmitted, the spring provides a small and lightweight. The device converts the short time force frequencies into long time or ultra low frequency forces which limits, not only the peak amount of the noise amplitude, but the transmission of noise as well.

The suspension member includes a serpentine spring which has a first spring rate which carries the at rest mass and first accelerations of the suspended mass, and which has a different spring rate superimposed on the initial spring rate to resist attaching points by an elastomer, or by attaching the spring, in either case sustaining low level amplitudes of vibration associated with the conduction of noise by the means of a combined elastomer that is optimized for absorption of energy. The combination results in a low cost structure that is capable of suspending the exhaust system and prohibiting the transmission of shock and noise from the exhaust system to the fixed mounting area.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 2 is a perspective view partially in section of an exhaust hanger in accordance with the present invention.

FIG. 3 is a sectional view of another exhaust hanger in accordance with the present invention.

FIG. 4 is a schematic view of a vehicle exhaust system on a vehicle.

DETAILED DESCRIPTION OF THE PREFERRED EMBODIMENT

Figure 1:
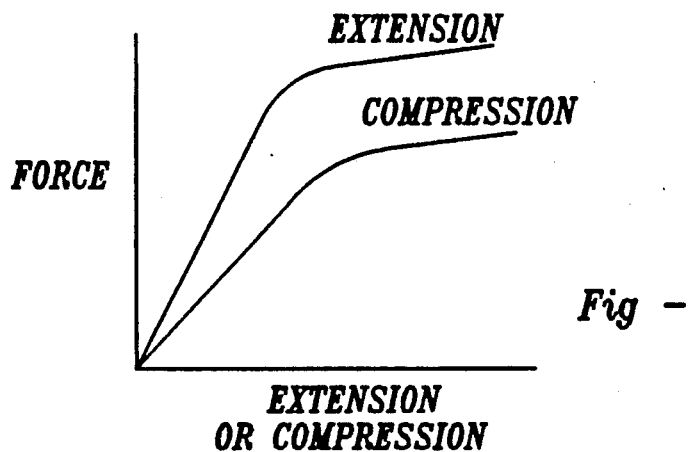
FIG. 1 is a graph of force v. extension or compression of a spring in accordance with the present invention.
Figure 1A:
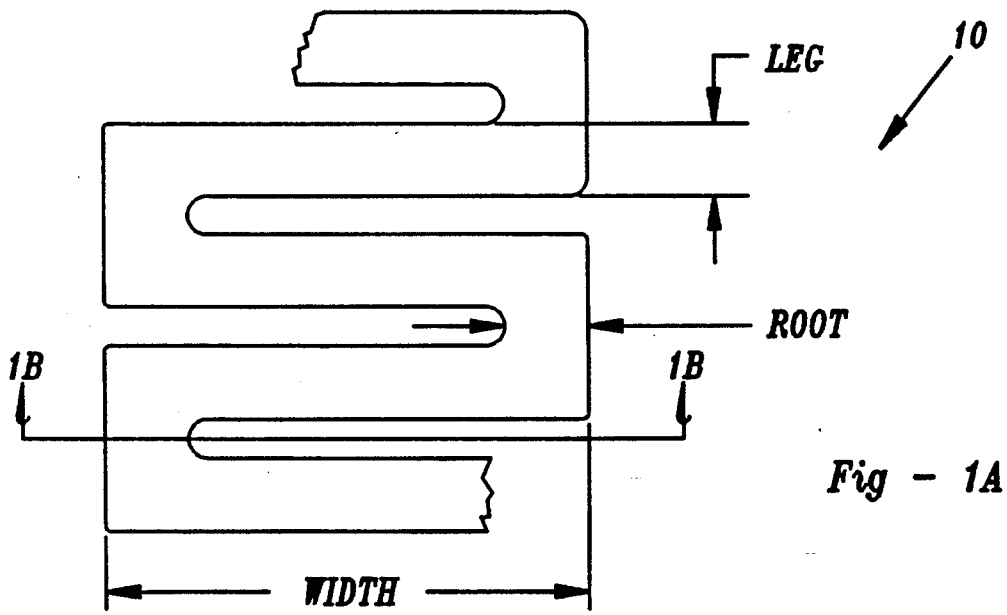
FIG. 1A is a plan view of the spring of FIG. 1A.

Turning to FIG. 1, a force vs. extension or compression graph for springs in accordance with the present invention is shown. The graph illustrates the unusual nature of this type spring, in that the initial slope of the curves are steeper than the slopes at higher forces. This occurs because the root portion of the spring is wider than the leg portion as will be explained herein.

Figure 1B:
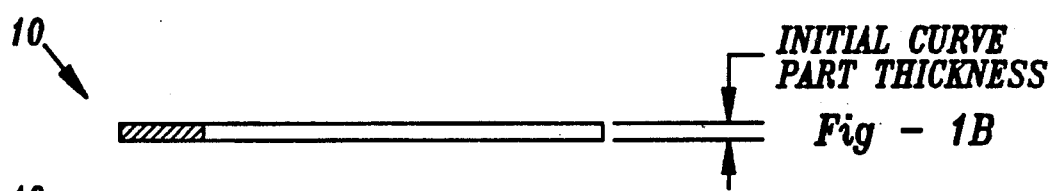
FIG. 1B is a sectional view of FIG. 1A through line 1B—1B.
Figure 1C:
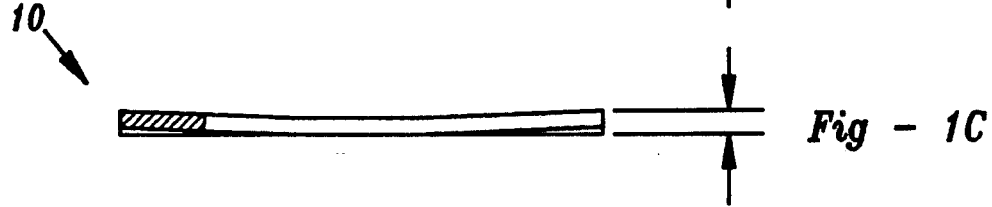
FIG. 1C is a sectional view like FIG. 1B in the second mode of extension.

The leg portions and root portions initially are deformed across their wide flat direction so that the spring remains flat, as shown in the end view for initial curve thickness as seen in FIG. 1B. At some point, which depends primarily on the design of the root portions, the metal strip starts to be deformed across the strip thickness direction. Deforming the metal across or compression than deforming across the broad face of the spring, thus the curve proceeds at a shallower slope as seen in FIG. 1C.

If one envisions an automotive exhaust system that is supported by springs of this type, stronger or stiffer springs would be utilized where the weight is greater, and lighter or less stiff springs would be utilized where the weight is less. Thus, movement of the entire exhaust system would occur without much tendency of any one portion of the system moving too much relative to another portion of the system.

The spring, being lightweight and small for its strength ability, is well suited for the packaging envelope that is required for exhaust system mounting. The spring curve, see FIG. 1, is also well suited, in light of the fact that when the acceleration forces are large, the spring allows extra movement (the second curve portion), but at high restoring force. This feature also extends the time over which shock forces are accommodated and thereby reduces any noise that is associated, as well as limiting the force that would otherwise be associated with the shock.

The energy of the event would be similar, being the area under the event curve, but the time is longer, and the peak forces are much less.

In compression, the spring must be prevented from buckling due to its thinness which does not exhibit much columnar strength. In this embodiment an elastomer encases the spring to absorb and damp out the higher frequency noise spectrum, and also to add to the columnar strength. In many events which must be accommodated by the support system, the engine would move more or less, than a well secured exhaust system. A joint may be used at the outlet of the engine exhaust manifold that allows a swivelling, or in-line wobble, providing a pivot which is also quite useful in the reduction of the shocks which must be accommodated by the exhaust system which is mounted to the vehicle. One such device is illustrated in U.S. Pat. No. 4,778,203 the specification of which is herein incorporated by reference.

Alternately, the connection to the vehicle exhaust system could be less compliant. The suspension elements could be designed to respond with greater extension further away from the engine. Thus, bending forces on the system as a whole would be reduced.

Referring to FIG. 2, exhaust hanger 10 is illustrated with a portion cut away. A portion of spring 12 is illustrated encapsulated by elastomer 14. The hanger has an overall rectangular shape with end connections to secure the hanger to an exhaust pipe and the vehicle. The cut away portion illustrates the spring 12 having legs 20 and root portions 22. Also, the spring has a plurality of apertures 24 to enable passage of the elastomer during molding to bond to the spring 12. The spring is like that disclosed in U.S. Pat. No. 4,919,403 entitled "Serpentine Strip Spring" issued Apr. 24, 1990, the specification of which is herein expressly incorporated by reference.

The elastomer 14 adds to the columnar strength of the hanger as previously discussed. The elastomer 14 may be of a soft resilient material due to the presence of the spring 12 to provide the necessary support to the system to handle the shock loads. Thus, the elastomer 14 is better adapted to absorb noise energy that is conducted by the spring.

FIG. 3 illustrates a portion of a hanger 10 having a pair of springs 12a and b shown in cross section. The springs 12a and b add additional strength and stiffness to the hanger 10. While two springs 12 are illustrated, it is understood that any number of springs may be encapsulated into the elastomer 14 to provide desired results.

It should be understood that the spring 12 and elastomer 14 may be of continuous length or joined to themselves to make a race track shaped loop. In this case, the ends are not spring sections, but are adapted to mount to devices attached to the exhaust system and/or the vehicle in a manner currently used for the rubber doughnuts.

FIG. 4 illustrates a phantom view of a vehicle 100 with an automotive exhaust system 100. The exhaust manifold 106 is connected to the suspended exhaust system 110 by a quick connector type connector 108. The pipe 112, catalytic convertor 114, second pipe 116, muffler 118 and tailpipe 120 are all suspended by the hangers of the present invention. In the embodiment shown, the extension of a particular hanger to a given acceleration could be different according to the mass being suspended and the position of the hanger member relative to the engine. Thus, different hangers having different spring constants and different stiffness may be positioned at different areas along the exhaust system to support the various elements. For example, stiffer hangers would be present at the catalytic converter than would be present at the tailpipe.

Figure 5:
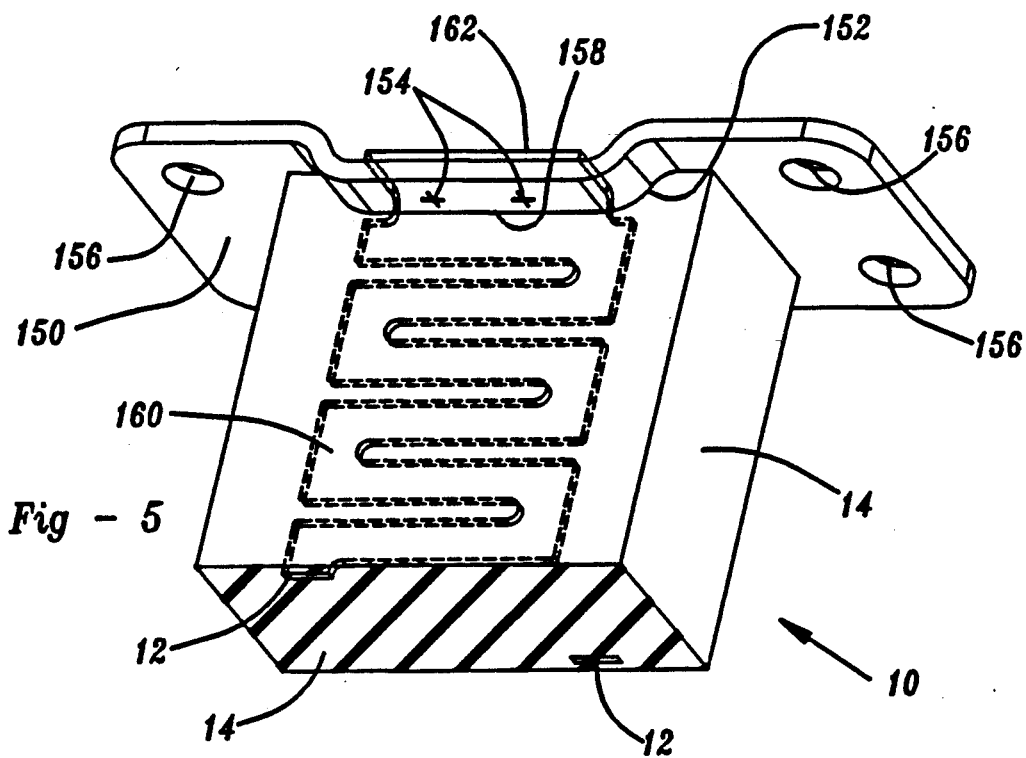
FIG. 5 is a perspective view of an attachment device of a hanger in accordance with the present invention.
Figure 6:
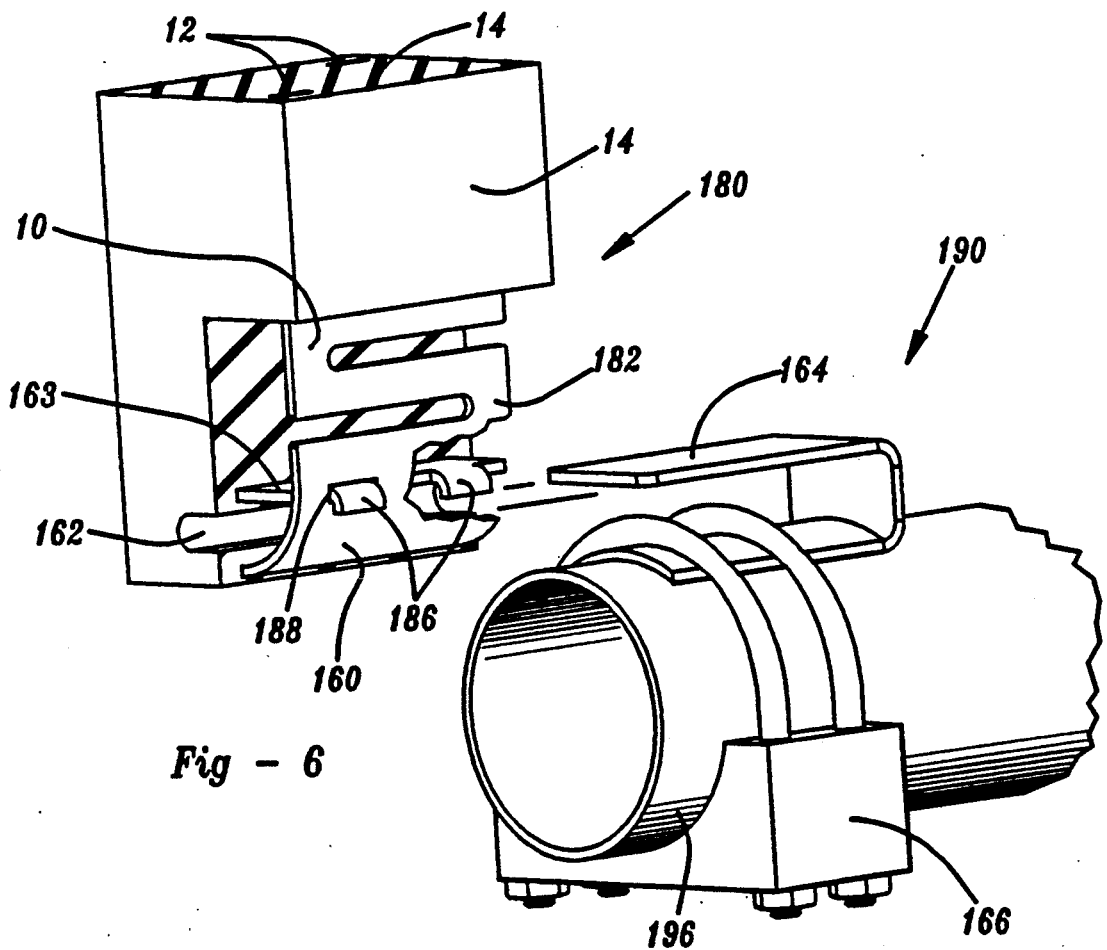
FIG. 6 is a perspective view of an attachment device of a hanger in accordance with the present invention.

FIG. 5 and 6 illustrate various types of connections for securing to the vehicle and to the exhaust system. FIG. 5 illustrates the spring 12 secured to a securement plate 150 by welding or the like. The plate 150 is generally rectangular in shape having slots 152 to nest the end of the spring in an indention 154. The plate 150 has a plurality of apertures 156 to enable the plate 150 to be secured to the vehicle. The plate 150 includes members 158 which define the lateral edge boundary of the elastomeric body 14 positioning the body between the members 158 as seen in FIG. 5.

Figure 7:
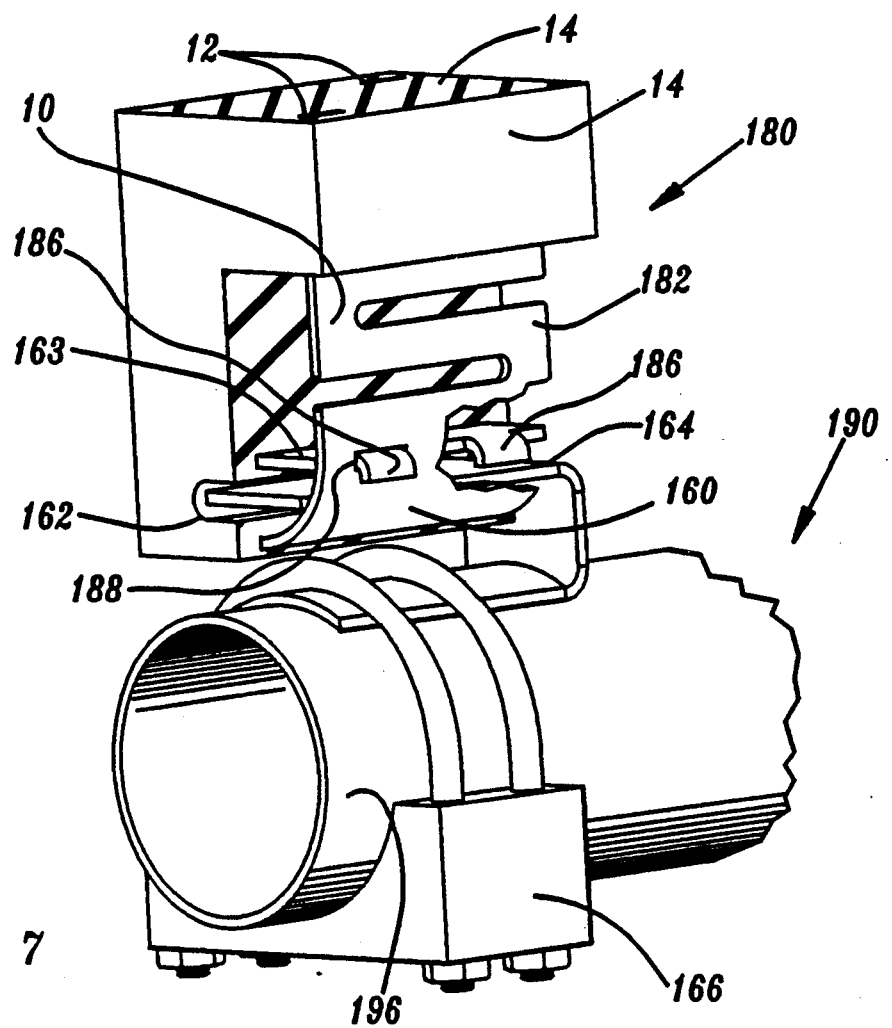
FIG. 7 is an assembled view of FIG. 6.

In FIG. 6, the spring members 12 are rolled to define a closed loop 160 in the elastomeric member 14. A bore 162 through the elastomeric member 14 encases the loop 160 in the elastomer. Means 163 are connected to spring 12 to assist spring 12 in responding to compressive motions. A finger shaped bracket 164 is adapted to be secured to the exhaust pipe and clamped has a shape to fit into the bore 162 within the elastomeric member 14 to enable the finger 164 to slide into the bore. Once the finger 164 is slid into the bore, as shown in FIG. 7, the hanger would be coupled with the exhaust pipe.

Figure 8:
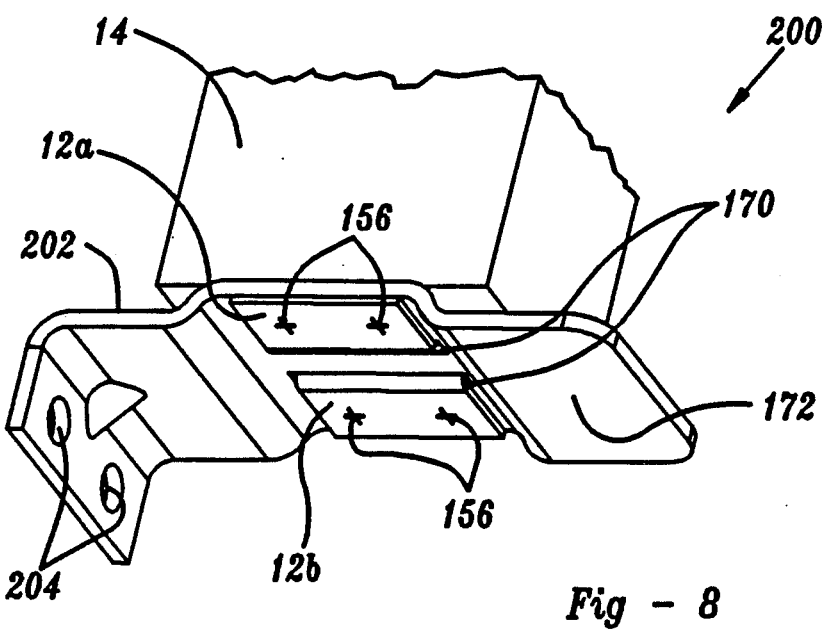
FIG. 8 is a perspective view of an attachment device of a hanger in accordance with the present invention.

FIG. 8 shows an additional mounting type assembly. The ends of the spring 12 are positioned through slots 170 in the L-shaped bracket plate 172 and secured thereto by welding or the like. The L-shaped bracket 172 has a pair a apertures 174 therethrough enabling connection of the bracket 172 to a catalytic convertor or the like. Also, the L-shaped bracket 172 may be utilized to secure the hanger member to the vehicle.

It has been illustrated that the combination of a serpentine spring manufactured from metal strip stock and encased in an elastomeric block is well suited to absorb sound energy and yield a construction that is well suited to mount and isolate a vehicle exhaust system. A broad area of the spring is in intimate contact with the elastomer to efficiently pass any noise energy to the elastomer which will in turn absorb the energy. It has also been shown that the spring portion of the exhaust system support device may be attached to the vehicle and to the exhaust system in a variety of different ways that are consistent and attractive to automotive designers.

While the above detailed description describes a preferred embodiment of the present invention, it will be understood that the present invention is susceptible to modification, variation and alteration without deviating from the scope and fair meaning of the subjoined claims.

What is claimed is:

1. A method of hanging an exhaust system including pipes, mufflers, catalytic convertors or the like to a vehicle, the method comprising:

provinding an exhaust system including a pipe, muffler, catalytic convertor, or exhaust component;

providing a plurality of hangers comprised of flat serpentine spring means which provides a suspension member between mounting points which carries the pipe, muffler, catalytic converter or exhaust component at rest and which resists further accelerations during movement, said serpentine spring means encased by an elastomeric material;

attaching one end of said hangers to said exhaust system at predetermined position on said exhaust system;

attaching the other end of said hangers to the underside of the vehicle;

hanging the exhaust system on the vehicle.

2. The method according to claim 1 further comprising providing said hangers with different spring constants and with different stiffness characteristics.

3. The method according to claim 2 further comprising attaching stiffer hanger adjacent the muffler and catalytic converter.

4. The method according to claim 3 further comprising attaching less stiff hanger away from the muffler and catalytic converter on the pipes.

5. An exhaust hanger comprising:

a flat serpentine spring means for providing stiffness and a suspension member between mounting points which carries an exhaust component at rest and which resists further accelerations of the exhaust component during movement to the hanger;

an elastomer cover encasing said flat serpentine spring means for dampening noise and vibration;

end means on each end of said hanger for enabling securement of said hanger to an exhaust system or to a vehicle under body.

6. The hanger according to claim 5 wherein said serpentine spring means is a flat planar strip of material formed in a serpentine configuration.

7. The hanger according to claim 6 wherein said serpentine strip includes a plurality of holes for enabling passage of said elastomeric cover through said serpentine strip.

8. The hanger according to claim 5 wherein said hanger elastomeric cover and serpentine spring means has an overall block shape.

9. The hanger according to claim 5 wherein said serpentine spring means includes one or more serpentine spring member encased in said elastomeric cover.

10. The hanger according to claim 5 where the serpentine spring means includes means formed into the strip for the purpose of improving the performance of the spring.

11. The hanger according to claim 5 where the hanger includes means of limiting the extension of the spring.

* * * * *

UNITED STATES PATENT AND TRADEMARK OFFICE
CERTIFICATE OF CORRECTION

PATENT NO. : 5,197,698
DATED : March 30, 1993
INVENTOR(S) : Donald D. Bartholomew It is certified that error appears in the above-identified patent and that said Letters Patent is hereby corrected as shown below:

Column 1, line 57, after "a", insert --suspension member between the mounting points that is strong,--.

Column 1, line 67, after "resist", insert --further accelerations. The spring may be isolated from the--.

Column 2, line 53, after "across", insert --the thickness direction requires less force per unit extension--.

Column 3, line 65, "100" should be --110--.

Column 4, line 29, after "clamped", insert --thereto by a clamping mechanism 166. The finger shaped bracket--.

Column 5, line 15, claim 3, "hanger" should be --hangers--.

Signed and Sealed this

Third Day of May, 1994

*Attest:*

BRUCE LEHMAN

*Attesting Officer*   *Commissioner of Patents and Trademarks*